Patented July 24, 1923.

1,462,747

UNITED STATES PATENT OFFICE.

HARRY GARRISON HALL, OF COTTONWOOD, ARIZONA.

CEMENT.

No Drawing. Application filed October 24, 1921, Serial No. 510,087. Renewed May 22, 1923.

*To all whom it may concern:*

Be it known that I, HARRY GARRISON HALL, a citizen of the United States, residing at Cottonwood, in the county of Yavapai and State of Arizona, have invented new and useful Improvements in Cement, of which the following is a specification.

My invention has reference, in its broad aspect, to cementing compositions for use in repairing automobile radiators; and more particularly it relates to improvements in outside radiator cements which are adapted to be applied directly to the leaking or punctured portion of the radiator to be repaired.

There are a number of cementing compositions which are applied from the interior of a radiator, in which case the cement is either permitted to flow to the broken portion or it is mixed with the cooling fluid. These inside radiator cements are subject to many disadvantageous features, not the least of which is the lowering of the cooling function of the fluid through impaired or sluggish circulation. Outside radiator cements, on the other hand, seldom impede the circulation of the cooling fluid, but heretofore many of them have been found to be too brittle, not sufficiently adhesive, and incapable of effecting a complete and elastic closure of a leak due to the vibration of the motor and jars caused by irregularities encountered in a road bed.

As distinguished from radiator cements heretofore known in the art, my composition when mixed with sufficient water to form a plastic, may be applied directly to a puncture in a radiator, whereupon it quickly dries, thereby effecting a complete and lasting closure which will not become deranged, broken or displaced.

The ingredients which I use in forming a cementing composition having the unique characteristics above defined, and others which will hereinafter appear are as follows:

| | |
|---|---|
| Portland cement | 89% |
| Lamp black | 6% |
| Powdered glue | 4% |
| Rosin | 1% |

These ingredients are mixed together and placed in packages in the form of a fine powder; a portion of which is mixed with water, sufficient to form a plastic substance when used. No sand or other filler is used in compounding the cement or applying the same.

Each of my ingredients performs a peculiar and distinct function when mixed with the whole. The Portland cement forms the body of the compound, but used alone it would be too brittle and non-adhesive. I consequently mix with the cement the portions of rosin and glue which lend the necessary adhesiveness and prevent the cement from becoming too hard and brittle. As the metal walls of the radiator expand and contract slightly with heat and cold I include the lampblack which permits of sufficient sponginess to form a tight closure. The lampblack also provides the desired coloring.

It will be seen that when my cement is forced into an opening through which the cooling fluid of an automobile radiator is leaking an effective and lasting closure will be formed. Furthermore my cement may be quickly and easily applied by one not particularly skilled along those lines.

While in the foregoing I have described my cementing composition, it is nevertheless desired to emphasize the fact that interpretation of the invention should only be conclusive when made in the light of the subjoined claims.

I claim—

1. A sealing material for radiators consisting of Portland cement, glue, rosin, lampblack, and sufficient water to form a plastic.

2. A sealing material for radiators comprising Portland cement 89%, lampblack 6%, powdered glue 4% and rosin 1%, all being mixed with sufficient water to form a plastic.

In testimony whereof, I affix my signature hereto.

HARRY GARRISON HALL.